April 30, 1940.   C. V. EVERETT   2,198,910
MOWER ATTACHMENT FOR TRACTORS
Filed Sept. 19, 1938   3 Sheets-Sheet 1
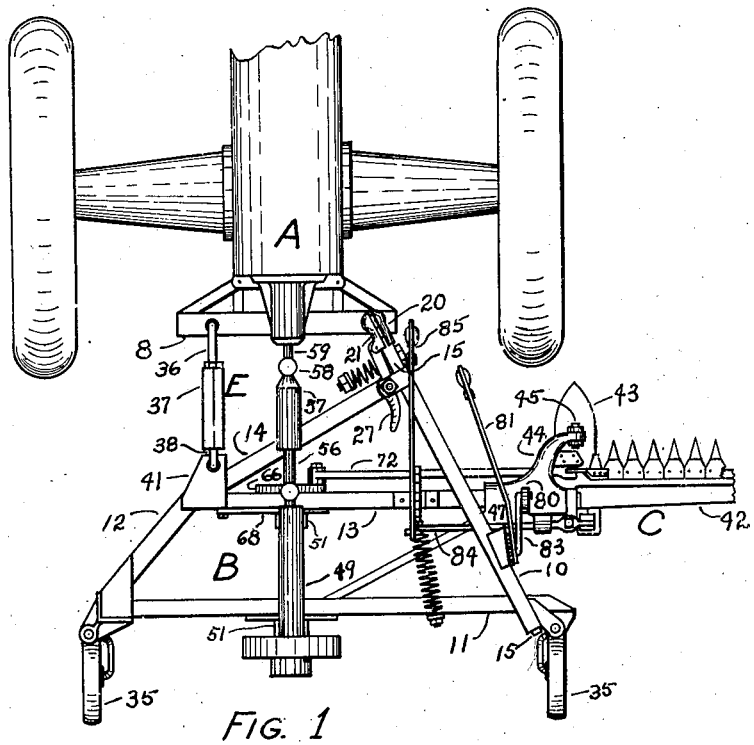
INVENTOR.
CHARLES VERN EVERETT
BY
ATTORNEY April 30, 1940.        C. V. EVERETT        2,198,910
MOWER ATTACHMENT FOR TRACTORS
Filed Sept. 19, 1938        3 Sheets-Sheet 2

INVENTOR.
CHARLES VERN EVERETT
BY
ATTORNEY

April 30, 1940.   C. V. EVERETT   2,198,910
MOWER ATTACHMENT FOR TRACTORS
Filed Sept. 19, 1938   3 Sheets-Sheet 3

INVENTOR.
CHARLES VERN EVERETT
BY  A. S. Nrot
ATTORNEY

Patented Apr. 30, 1940

2,198,910

UNITED STATES PATENT OFFICE 2,198,910

MOWER ATTACHMENT FOR TRACTORS

Charles Vern Everett, Racine, Wis., assignor to The Massey-Harris Co., Racine, Wis., a corporation of Maryland Application September 19, 1938, Serial No. 230,638

5 Claims. (Cl. 56—25)

The present invention relates to mower attachments for tractors wherein the entire frame is made stable by two spaced rear end caster wheels and a forwardly extending inner end which is secured to the draw bar of the tractor by means of a universal joint. The outer forward corner is a distance from the tractor draw bar and has a draft link therebetween thus to cause the attachment to normally follow the tractor in working position.

An object of the present invention is to provide a telescoped joint between the universal joint and the inner side of the frame having a releasable overload device therebetween whereby if the cutter bar meets serious resistance, it and the frame will be permitted to swing rearwardly and prevent breakage.

The telescoped connection is made long enough so contact with the draw bar is not broken whereby the frame will remain stable after it and the cutter bar has swung rearwardly and all that is necessary to return it to its working position is to back the tractor.

Another object of the present invention is to provide means whereby the upper counter shaft may be adjusted to various transverse positions whereby this shaft may be positioned in longitudinal alignment with the power take-off shaft of the tractor.

To these and other useful ends my invention consists of parts, combinations of parts or their equivalents, and mode of operation, as hereinafter described and claimed and shown in the accompanying drawings in which:

Fig. 1 is a fractional top plan view of my improved attachment shown as attached to the draw bar of a tractor.

Fig. 2 is a stubble side elevational view of the attachment as shown in Figure 1.

Figure 9:
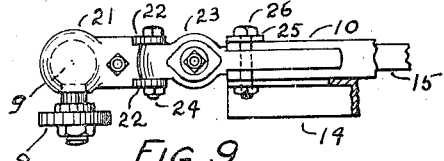
Fig. 9 is an enlarged fractional side elevation of the frame as illustrated in Figure 7.

As thus illustrated, a fraction of a tractor is shown, which is designated by reference character A having a draw bar 8. I mount a ball 9 on one end of bar 8 by means of a suitable neck, having a flange and nut as clearly illustrated in Figure 9.

The frame of my attachment is designated in its entirety by reference character B and the cutter bar in its entirety by reference character C.

Frame B comprises a square tube 10, a rear bar 11, a side bar 12, a medial bar 13 and a front bar 14 the parts being assembled as clearly illustrated in Figure 1. The joints between the frame members are secured together by electric welding or otherwise.

Figure 8:
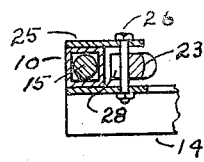
Fig. 8 is a sectional view of the frame taken on line 8—8 of Figure 7.
Figure 10:
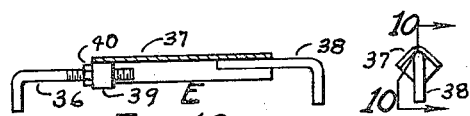
Fig. 10 is an enlarged side view of the draft link, the medial member being sectioned on line 10—10 of Figure 11.
Figure 11:
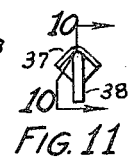
Fig. 11 is a rear view of the draft link.

By scrutinizing Figures 1 and 8 it will be seen that member 10 is positioned on the top of members 11, 13 and 14 for reasons which will be apparent.

Figure 7:
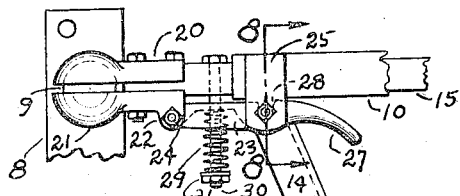
Fig. 7 is an enlarged fractional top view of the front end of the frame and its connection to the draw bar.

I provide a shaft 15 which is slidably mounted in tube 10, the front end protruding as illustrated in Figure 7 and having mounted thereon a two piece socket joint comprising members 20 and 21 which are secured to member 15 by means of spaced bolts as clearly illustrated in Figure 7 and being adapted at their front ends to snugly embrace ball 9.

Member 21 is provided with spaced ears 22—22 to which is pivotally mounted a release trip 23 by means of bolt 24. I secure a plate 25 to the front upper side of member 10 as illustrated and having a bolt 26 which passes through this plate and frame member 14.

Trip 23 is curved rearwardly and outwardly as at 27 and is also provided with a recess as at 28 and being adapted to engage bolt 26, the rear or pulling edge being slightly angled whereby it may become disengaged provided the tractor pull is great enough to overcome the tension of spring 29 which is mounted on bolt 30 as illustrated. This bolt is provided with a nut 31 whereby the pull necessary to disengage trip 23 may be variously adjusted. Obviously other well known disengaging means may be provided, the object being solely to hold the cutter bar in its normal position so long as a fixed or serious obstruction is not encountered.

I provide rear carrying caster wheels 35—35 and mount them on the frame preferably as illustrated. These caster wheels cooperate with the ball and socket joint between members 15 and 8 and act to hold the frame A in its normal horizontal position. I provide a draft link, which in its entirety is designated by reference character E, comprising a front link 36 and a center bar 37 to which rear link 38 is secured. A nut 39 is welded to the front end of member 37 as illustrated. Link 36 is adapted to be screw threaded into nut 39 and is locked thereto by means of nut 40. Link 36 is hooked into tractor draw bar 8 as illustrated in Figure 1 and link 38 is hooked into a frame plate 41 this plate being secured to frame B in a manner to thereby strengthen the joints between frame members 12, 13, and 14.

Figure 12:
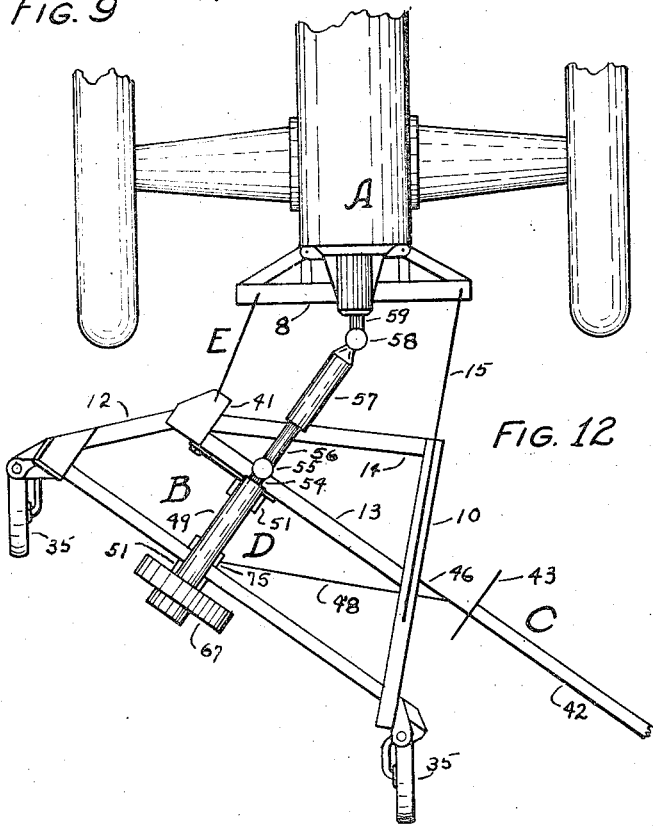
Fig. 12 is a diagrammatic top view of the attachment illustrating a position of the frame taken after the trip has been released.

Thus it will be seen that the frame is stabilized by rear caster wheels and the ball and socket joint and prevented from swinging on this joint by draft link E except when trip 23 is released at which time the ball and socket joint will continue to stabilize the frame but permit it to move rearwardly on shaft 15 and swing around on the draft link E as illustrated in Figure 12 at which time the draft link is the sole pulling means. Clearly the draft link will not interfere with the movements of the frame as the caster wheels and tractor pass over uneven ground.

I provide a cutter bar which in its entirety is designated by reference character C and mount it to frame B as follows:

Member C may be of conventional design comprising a cutter bar 42 having a runner shoe 43 which is hingedly secured to a coupling yoke 44 as at 45—45. Yoke 44 is rotatably mounted on the free end of coupling arm 46 (see Figure 3).

I mount a collar 47 on member 46 and position it adjacent yoke 44 and screw thread a shaft 48 therein. I provide a counter shaft frame which in its entirety is designated by reference character D. Frame D comprises upper and lower tubes 49 and 50 being secured together by means of channel pieces 51—51. Tube 50 is rotatably mounted in the lower end of plates 52 and 53, plate 52 being secured to frame bar 13 and plate 53 being secured to frame bar 11.

A shaft 54 is rotatably mounted in tube 49 the front end being provided with a universal joint 55 having a shaft 56 which is splined in a sleeve 57. I provide a universal joint 58 with which an operating connection is made to the power take-off shaft 59.

Figure 4:
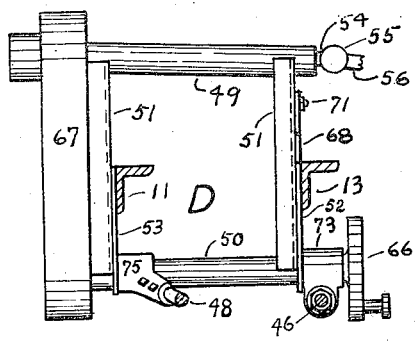
Fig. 4 is a side elevation of the counter shaft frame.
Figure 5:
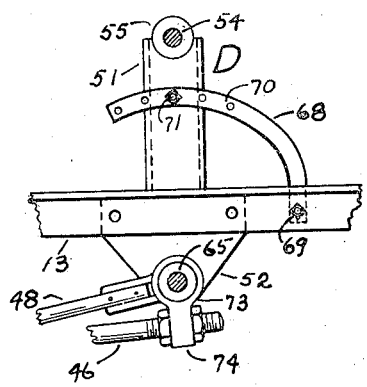
Fig. 5 is an end view of the frame as shown in Figure 4 illustrating the counter shaft adjusting means, a fraction of the main frame and a fraction of the cutter bar connections.
Figure 3:
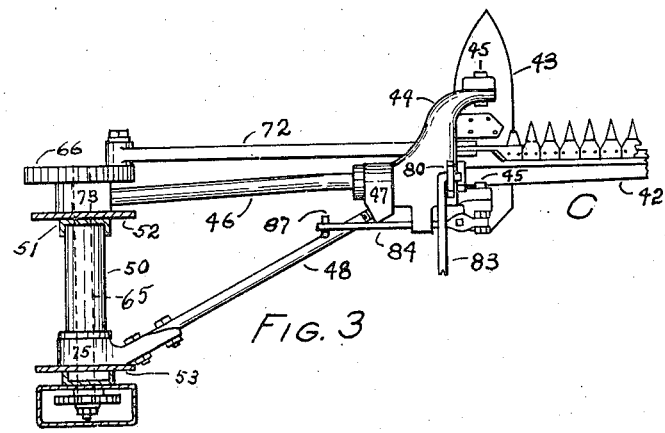
Fig. 3 is a fractional top view of the cutter bar and its connections to the transmission frame and pitman driving means.
Figure 6:
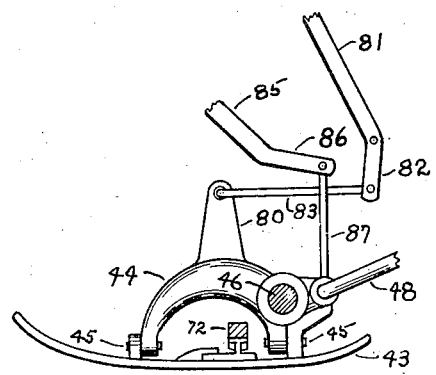
Fig. 6 is a drawing illustrating fractionally the cutter bar lever connections.

I rotatably mount a shaft 65, see Figures 3 and 5, in tube 50 having at its front end a crank wheel 66. I mount sprockets, one being shown in Figure 3, on the rear end of shafts 54 and 65 and operatively connect these sprockets by means of a roller chain (not shown). These sprockets and the chain are adapted to be inclosed within a housing 67.

I provide a curved bar 68 which is secured to frame bar 13 by means of bolt 69, the bar being provided with a series of holes 70 and a bolt 71 acting to hold member D in any desired position in order to cause shaft 54 to be held in vertical alignment with the power take-off shaft 59 thus to accommodate various tractor hitches.

The sickle bar of member C is operatively connected to the crank of member 66 by means of pitman 72. I provide a collar 73 which is rotatably mounted on the forward end of member 50 to which member 46 is adjustably secured through a projection 74 (see Figure 5).

A collar 75 is provided and rotatably mounted on the rear end of tube 50. Member 46 is secured to this collar as illustrated in Figures 3 and 5, thus it will be seen that shoe 43 is free to travel over uneven ground and that the cutter bar 42 may be turned or tilted on member 46 in the following manner:

An arm 80 is provided on member 44 and a lever 81 is pivotally mounted on frame bar 10 having a latch and sector and a depending portion 82 which is operatively connected to arm 80 by means of link 83 thus the operator may conveniently adjust the tilt of the cutter bar.

Cutter bar 42 is lifted in the conventional manner through an arm 84 and lever 85. This lever is provided with a suitable latch and sector and a rearwardly extending portion 86 which is operatively connected to arm 84 by means of link 87. Thus it will be seen that the operator may raise and lower the cutter bar at will.

It will be seen that my improved mower attachment is simple, strong and compact; that it may easily be attached to the tractor draw bar and easily detached therefrom; that the counter shaft may be conveniently tilted so as to normally be in alignment with the tractor power take-off shaft; that my frame is free to travel over uneven ground and that the caster wheels will permit backing and short turns.

Clearly when the release is tripped, the cutter bar and frame may swing back without being detached with the draft link as the sole pulling means. Therefore by backing the tractor, the draft link will act as a push bar and the frame will be caused to return to its operating and locked position without inconvenience to the operator. This reset may clearly be accomplished without lifting the cutter bar or the bar may be lifted for the purpose.

Clearly many minor detail changes may be made without departing from the spirit and scope of the present invention as recited in the appended claims.

Having thus shown and described my invention, I claim:

1. A device of the class described, comprising a frame adapted to be drawn and powered by a tractor having two supporting caster wheels mounted on the rear corners thereof, a draft link forming a connection from the stubble side of the frame to the hitch bar of the tractor, the other side of the front of the frame extending to near the hitch bar of the tractor and comprising a rectangular tube, a shaft slidably mounted in said tube and having at its forward end a universal joint connection to the hitch bar of the tractor, a cutter bar mounted on said frame and extending laterally from said other side of the frame, an upper and a lower countershaft mounted on the rear of said frame between said caster wheels and being operatively connected together, a crank wheel on the front end of said lower shaft being operatively connected to the sickle of said cutter bar by means of a pitman, a flexible operating connection between the front end of said upper countershaft and the power take-off of the tractor, an overload releasable connection between the front end of said slidable shaft and said frame whereby when said cutter bar meets serious obstruction, said releasable connection will be disengaged and said cutter bar and frame will be permitted to swing rearwardly with said draft link as a pivot.

2. A mower of the class described, comprising a frame adapted to be pulled and powered by a tractor, a laterally extending cutter bar hingedly mounted on said frame, upper and lower countershafts mounted on said frame and having an operating connection between their rear ends, a crank wheel mounted on the forward end of said lower shaft and being operatively connected to said cutter bar, the front end of said upper shaft adapted to be operatively connected to the power take-off shaft of the tractor, said upper shaft being rotatably mounted in the upper end of a bracket, the lower end of which is hingedly mounted on the axis of said lower shaft, means whereby said bracket may be held in a predetermined position.

3. The combination of a tractor having a power take off and a hitch bar, of a mower comprising a frame having two supporting caster wheels mounted on the rear corners thereof, a draft link forming a connection from the front stubble side of the frame to the hitch bar of the tractor, the other side of the front of the frame extending to near the hitch bar of the tractor and comprising a tube, a shaft slidably mounted in said tube and having at its forward end a universal joint connection to said hitch bar, a cutter bar mounted on said frame and extending laterally from the tube side thereof, an upper and a lower countershaft mounted on the rear of said frame between said caster wheels and being operatively connected, a crank wheel on the front end of said lower shaft having a pitman forming an operating connection to said cutter bar, a shaft having means to form a flexible operating connection between the front end of said upper countershaft and said power take-off, an overload releasable connection between the front end of said slidable shaft and the adjacent front end of said frame whereby when said cutter bar meets serious obstruction, said releasable connection will be disengaged and said cutter bar and frame will be permitted to swing rearwardly with said draft link as a pivot.

4. A device as recited in claim 3 including: said upper shaft being mounted on a bracket having its lower end hingedly mounted concentric with said lower shaft and means whereby said upper shaft may be held in a predetermined transverse position.

5. The combination of a tractor having a hitch bar, of a mower comprising a rigid frame having two supporting castered wheels mounted on the rear corners thereof, a draft link forming a connection from the stubble side of said frame to the adjacent end of said hitch bar and being of a length which will permit free vertical movement of said frame, the other side of said frame extending to near the adjacent end of said hitch bar and having a tube, a shaft slidably mounted in said tube and having a universal joint connection at its forward end to said hitch bar whereby said castered wheels and universal joint will act as a three point support for said frame, a cutter bar secured to said frame and extending laterally from said other side, an overload connection between said shaft and frame adapted to be disengaged by excessive pressure against said cutter bar whereby said frame will be free to swing rearwardly on said draft link as a pivot.

CHARLES VERN EVERETT.